H. S. WILLIAMS.
COOLING DEVICE.
APPLICATION FILED APR. 4, 1919.
1,356,325.
Patented Oct. 19, 1920.
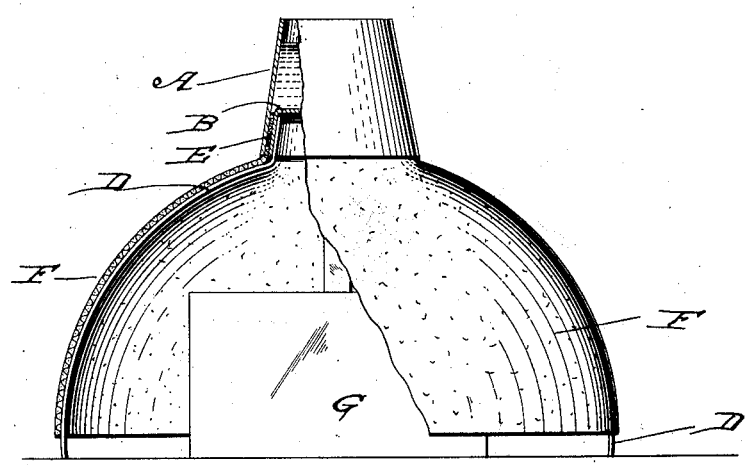
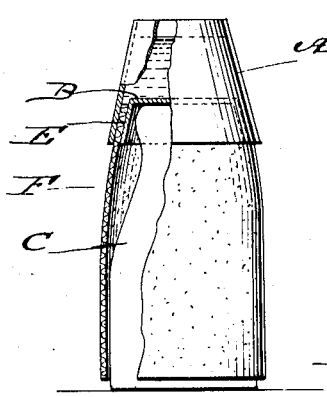
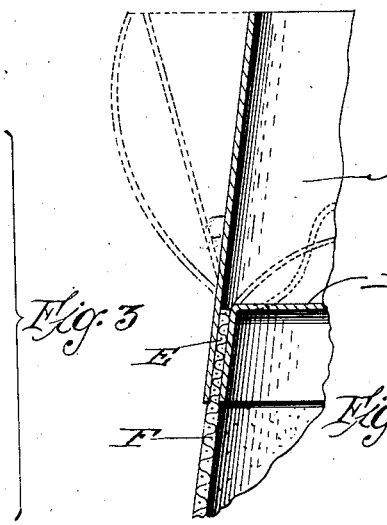
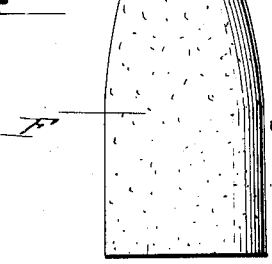
Inventor:
Harold S. Williams.

UNITED STATES PATENT OFFICE.

HAROLD S. WILLIAMS, OF SANTA CRUZ, CALIFORNIA.

COOLING DEVICE.

1,356,325. Specification of Letters Patent. Patented Oct. 19, 1920.

Application filed April 4, 1919. Serial No. 287,524.

*To all whom it may concern:*

Be it known that I, HAROLD S. WILLIAMS, a citizen of the United States, residing at Santa Cruz, in the county of Santa Cruz and State of California, have invented certain new and useful Improvements in Cooling Devices, of which the following is a specification.

My invention relates to refrigerating apparatus, and is what may be most properly termed an evaporating cooler or refrigerating device.

The main object of my invention is the provision of a simple and cheap device which will keep liquids or solids, such as meats, food, vegetables or perishable articles in a cool and fresh condition without the use of ice.

Another object is the provision of an evaporating cooling device capable of easy application to a bottle or vessel containing milk or other liquid, or which may be placed over food and other objects to be cooled, which will operate without the use of ice, proving a great saving in expense while being entirely effective and practical for the purposes intended.

To attain the desired objects, the invention consists of a receptacle to contain a cooling liquid, and means connected with said receptacle to provide a skirt or cover and to distribute the liquid to effect the cooling of either a liquid or object placed under said cover or skirt.

The invention further consists of a cooling device of the character and for the purposes stated embodying novel features of construction and combination of parts substantially as shown, described and claimed.

In the drawings:

Figure 1 is a view partly in elevation and partly in section of the form of my device best adapted for keeping meat, food, or solids in cool and fresh condition.

Fig. 2 is a side view partly broken away of the form of my device used upon a bottle or container for milk or other liquid.

Fig. 3 is a side view of the elements comprising the device shown in Fig. 2, and Fig. 4 is a detail view of a modified form of my improvement.

The device is of extremely simple and inexpensive construction and consists of a container for water A of suitable size or shape, a cap B forming the bottom of said container and adapted to rest upon a bottle or container C, or upon a suitable frame or stand D, and between the walls of the container A and cap B is clampingly secured the upper edge E of the cover or skirt F made of fabric or any suitable material which will absorb the water from the container and distribute it to the object G, or to the bottle C, for the purpose of keeping the cover or skirt saturated to impart its coolness to the object or bottle.

In operation the device is placed upon the filled bottle, or over the object, and the water or cooling liquid is fed slowly to the skirt and by the process of evaporation serves to keep the liquid in the bottle or the object under the skirt in a cool and fresh condition in warm weather without the use of ice.

It must be at once apparent that my device dispenses entirely with ice, effecting a great saving, and that the water acting as a cooling medium feeds the porous cover and entirely saturates it, imparts to the food or liquid a complete and even cooling.

It is evident that my device is small, simple and cheap and, by reason of its efficiency and saving of ice, will prove a most useful and desirable article.

I claim:

1. A cooling device consisting of a substantially truncated cone shaped cap closed at its small end, a skirt of absorbent material to be fitted over said cap to hang from the large end thereof, and a water container made in the form of a truncated cone shaped sleeve to be fitted with its large end over the cap to clamp and frictionally hold the skirt in place thereon.

2. A cooling device consisting of a supporting frame having a truncated cone-shaped member at the top thereof, a skirt of absorbent material to be fitted upon said member and drape over the frame, and a water container having a tapered rim to fit over said cone-shaped top member, to grip and frictionally hold the skirt thereon.

In testimony whereof I affix my signature.

HAROLD S. WILLIAMS.